US008294030B2

(12) United States Patent
Pollard, Jr.

(10) Patent No.: US 8,294,030 B2
(45) Date of Patent: Oct. 23, 2012

(54) CABLE BUS SUPPORT BLOCK AND SYSTEM

(75) Inventor: Michael E. Pollard, Jr., Greenville, SC (US)

(73) Assignee: MP Husky, Greenville, SC (US)

( * ) Notice: Subject to any disclaimer, the term of this patent is extended or adjusted under 35 U.S.C. 154(b) by 760 days.

(21) Appl. No.: 12/313,199

(22) Filed: Nov. 18, 2008

(65) Prior Publication Data

US 2010/0122836 A1 May 20, 2010

(51) Int. Cl.
*H01B 17/00* (2006.01)

(52) U.S. Cl. ..... 174/155; 174/650; 174/72 A; 174/77 R; 248/68.1; 248/74.1

(58) Field of Classification Search ............ 174/650, 174/656, 68.1, 68.3, 72 A, 72 R, 77 R, 88 R, 174/70 C, 95, 657, 652, 480, 481, 482, 505, 174/152 G, 153 G, 142, 152 R, 92, 155, 137 R; 248/56, 68.1, 74.1; 16/2.1, 2.2
See application file for complete search history.

(56) References Cited

U.S. PATENT DOCUMENTS

| | | | | |
|---|---|---|---|---|
| 2,355,742 A | * | 8/1944 | Morehouse | 248/68.1 |
| 2,732,226 A | * | 1/1956 | Brattberg | 248/56 |
| 3,023,989 A | | 3/1962 | White | |
| 3,282,544 A | * | 11/1966 | Brattberg | 248/56 |
| 3,363,048 A | | 1/1968 | Vaughn | |
| 4,249,353 A | | 2/1981 | Berry | |
| 4,291,195 A | * | 9/1981 | Blomqvist et al. | 248/56 |
| 4,419,535 A | * | 12/1983 | O'Hara | 174/505 |
| 4,702,444 A | * | 10/1987 | Beele | 248/56 |
| 4,733,016 A | * | 3/1988 | Twist et al. | 174/657 |
| 4,775,121 A | * | 10/1988 | Carty | 248/68.1 |
| 4,851,803 A | * | 7/1989 | Hahn | 174/92 |
| 4,884,774 A | * | 12/1989 | Rodi et al. | 248/56 |
| 4,892,275 A | | 1/1990 | Szegda | |
| 5,022,614 A | | 6/1991 | Rinderer | |
| 5,100,086 A | | 3/1992 | Rinderer | |
| 5,209,619 A | | 5/1993 | Rinderer | |
| 5,372,341 A | | 12/1994 | Witherbee et al. | |
| 5,384,937 A | | 1/1995 | Simon | |
| 5,385,320 A | | 1/1995 | Ismert et al. | |

(Continued)

OTHER PUBLICATIONS

Canadian Intellectual Property Office; Canadian Patent Application No. 2,691,901; Industry Canada; pp. 1-2; publisher Canadian Intellectual Property Office; Published Gatineau, Quebec, Canada; copyright and mailing date Apr. 11, 2011; (2 pages).

United States Patent and Trademark Office; Office Action; Office Action from U.S. Appl. No. 12/383,632; copyright and mailing date Sep. 7, 2011, pp. 1-11, publisher United States Patent and Trademark Office, Alexandria, Virginia, USA; (11 pages).

(Continued)

*Primary Examiner* — Angel R Estrada
(74) *Attorney, Agent, or Firm* — J. Bennett Mullinax LLC

(57) ABSTRACT

A cable bus system is provided. The system may include a first cable bus support block mounted to a bus housing. The first block has a body with a front face, back face, and top face. The body of the first block defines a first cable receiving feature that extends from the front face to the back face of the body. First marking indicia is present on the front face of the first block. A second cable bus support block is adjacent the first block. The second block has a body with a front face, back face, and bottom face. The body of the second block defines a second cable receiving feature that extends from the front face to the back face of the body of the second block. Second marking indicia is present on the front face of the second block.

20 Claims, 4 Drawing Sheets

U.S. PATENT DOCUMENTS

| | | | |
|---|---|---|---|
| D361,982 S | 9/1995 | Rinderer | |
| 5,457,285 A | 10/1995 | Faust et al. | |
| 5,465,929 A | 11/1995 | Dooley | |
| 5,564,658 A | 10/1996 | Rinderer | |
| 5,580,014 A | 12/1996 | Rinderer | |
| 5,587,555 A | 12/1996 | Rinderer | |
| 5,704,571 A | 1/1998 | Vargo | |
| 5,939,676 A * | 8/1999 | Birmingham et al. | 174/656 |
| 5,992,802 A | 11/1999 | Campbell | |
| 6,261,037 B1 | 7/2001 | Richards et al. | |
| 7,288,730 B2 * | 10/2007 | Habel et al. | 174/650 |
| 7,377,472 B2 * | 5/2008 | Brown et al. | 248/74.1 |
| 7,952,027 B2 * | 5/2011 | Grelck | 174/72 A |
| 2005/0006535 A1 | 1/2005 | Brown et al. | |
| 2008/0245932 A1 | 10/2008 | Prellwitz et al. | |

OTHER PUBLICATIONS

Canadian Intellectual Property Office; Canadian Patent Application No. 2,691,901; Industry Canada; pp. 1-2; publisher Canadian Intellectual Property Office; Published Gatineau, Quebec, Canada; copyright and mailing date Oct. 3, 2011; (2 pages).

United States Patent and Trademark Office; Office Action; Office Action from U.S. Appl. No. 12/383,632; copyright and mailing date Jan. 3, 2012, pp. 1-10, publisher United States Patent and Trademark Office, Alexandria, Virginia, USA; (10 pages).

United States Patent and Trademark Office; Office Action; Office Action from U.S. Appl. No. 12/383,632; copyright and mailing date Apr. 25, 2012, pp. 1-9, publisher United States Patent and Trademark Office, Alexandria, Virginia, USA; (9 pages).

* cited by examiner

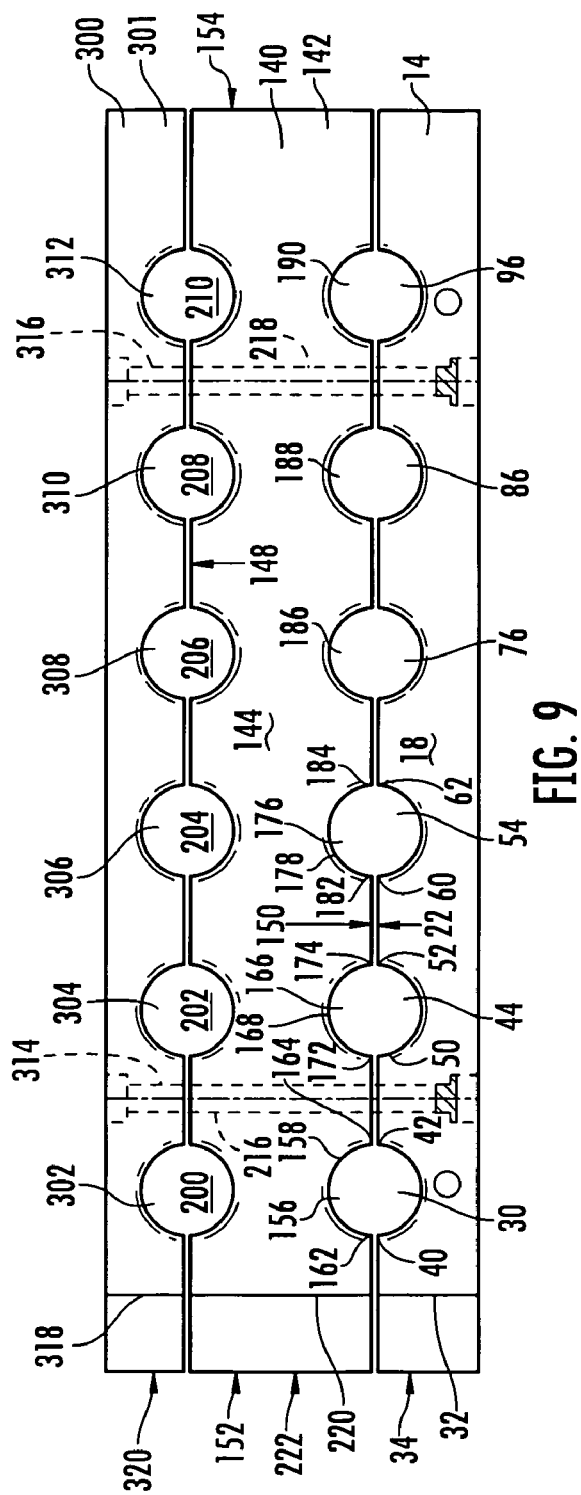
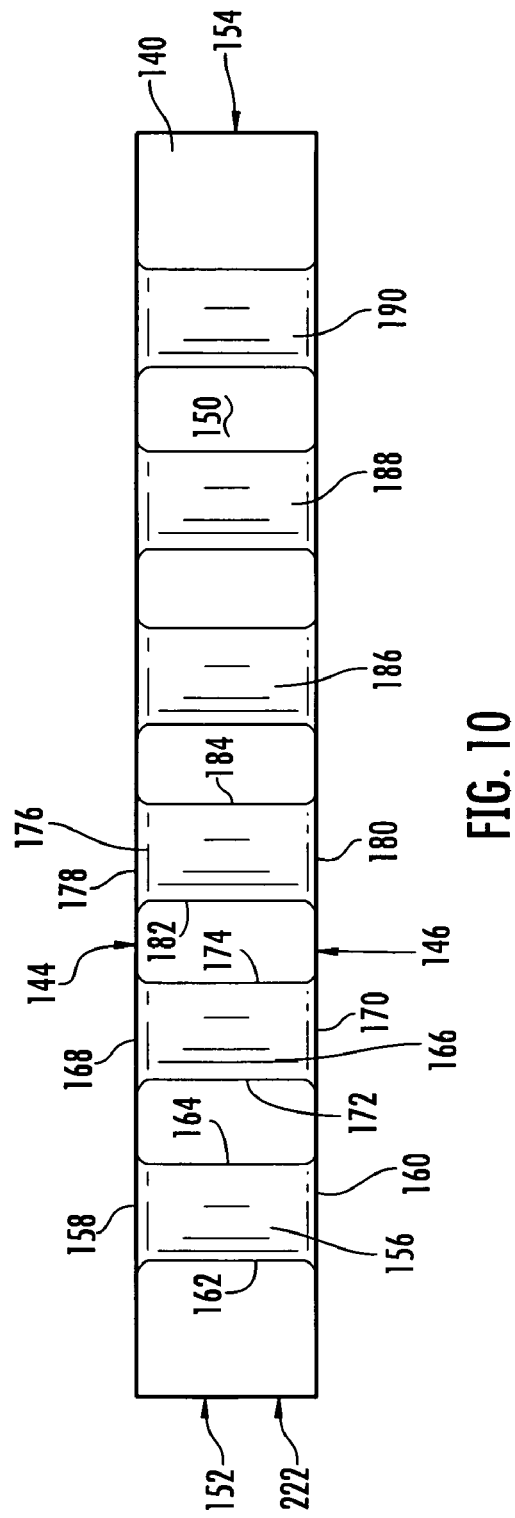

CABLE BUS SUPPORT BLOCK AND SYSTEM

FIELD OF THE INVENTION

The present invention relates generally to a cable bus support block and a cable bus system for use in housing and supporting cable such as power cable. More particularly, the present application involves a polymer based cable bus support block that includes a fire retardant, and a cable bus system that includes cable bus support blocks that are marked with identifying indicia to facilitate assembly.

BACKGROUND

Cable bus systems are used to house and route power cable through installations such as industrial plants, offshore facilities, utility plants, electrical arc furnaces, and commercial sites. The cable bus system typically functions to deliver power from a plant's power source to primary load centers. Cable bus systems can be used both in indoor and outdoor settings and may extend in both straight and curved sections. Further, cable bus system may extend in both horizontal and vertical directions so that the required cable can be routed through complex and tight geometries as needed.

The cable bus system includes a cable bus support block that can hold one or more fully jacketed cables therein. The cable bus support block functions to provide strength to the system when short circuits in the lines occur. Multiple cable bus support blocks may be disposed along the length of the cable bus system. In some applications, the cable bus support block may be spaced at two feet or three feet intervals from one another along the length of the cable bus system so that the cable is properly supported. The cable bus support blocks can be bolted to a bus housing that surrounds the spaced cable blocks and the routed cable to protect these components and to provide a structure for attaching the cable bus system to a ceiling, floor or other member at the site. The bus housing may be made of metal such as aluminum or steel and can be ventilated in order to maintain the cable within an appropriate temperature range.

The cable bus system is field installed and thus requires an installer to correctly orient and locate the cable bus support blocks along the length of the cable bus system. Due to various sizes and configurations of the cable bus support blocks, the installer may incorrectly assemble the cable bus support blocks at the wrong location in the cable bus system. Further, the cable bus support blocks may not be correctly oriented with respect to one another when they are stacked on top of one another in certain arrangements. These problems result due to the fact that the cable bus support blocks are different in shape and orientation, yet close enough upon first glance to appear to match one another. Installation time is wasted when installing cable bus systems due to the inability of the installer to efficiently match and orient cable bus support blocks to and with one another. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 9 is a front view of the cable bus support blocks of the cable bus system of FIG. 7.

FIG. 10 is a bottom view of the intermediate cable bus support block of the cable bus system of FIG. 7.

Figure 1:
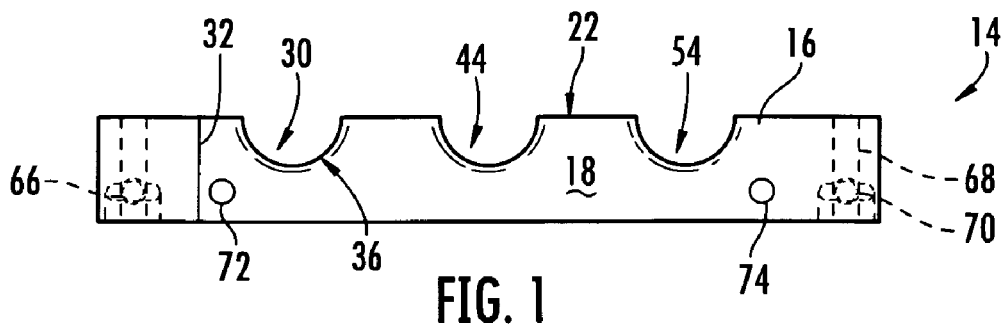
FIG. 1 is a front view of a cable bus support block in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a cable bus system 10 for use in routing cable 134, such as power cable, through industrial plants, offshore platforms, commercial sites, and other applications. The cable bus system 10 may have a cable bus support block 14 that is made out of material that includes polyethylene and fire retardant material. The cable bus support block 14 may include first marking indicia 32 located on its front face 18 in order to match the cable bus support block 14 with a matching cable bus support block 140 that has matching marking indicia 220. The marking indicia 32 and 220 may also be used to properly orient the cable bus support blocks 14 and 140 with respect to one another to facilitate fast and correct instillation of the cable bus system 10 in the field. The cable bus support block 14 may also include cable receiving features that have rounded edges for use in decreasing wear on cable 134 that is supported by the cable bus system 10.

Figure 2:
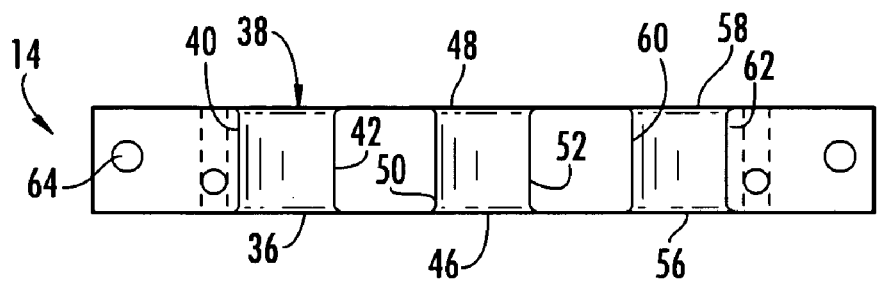
FIG. 2 is a top view of the cable bus support block of FIG. 1.
Figure 3:
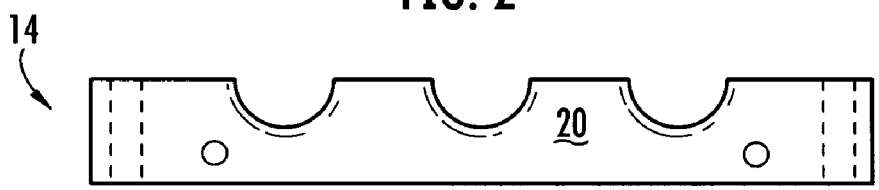
FIG. 3 is a back view of the cable bus support block of FIG. 1.
Figure 4:
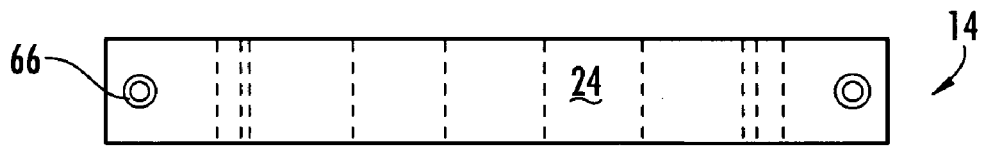
FIG. 4 is a bottom view of the cable bus support block of FIG. 1.
Figure 5:
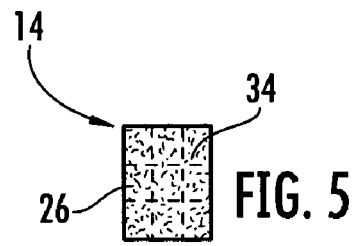
FIG. 5 is a left side view of the cable bus support block of FIG. 1.
Figure 6:
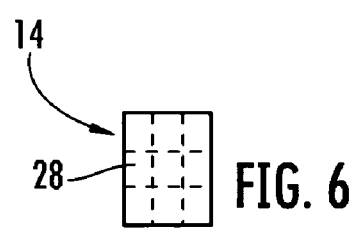
FIG. 6 is a right side view of the cable bus support block of FIG. 1.

One exemplary embodiment of a first cable bus support block 14 is shown in FIGS. 1-6. The cable bus support block 14 includes a body 16 that has a front face 18 and an oppositely disposed back face 20. The front and back faces 18 and 20 are generally flat with apertures disposed therethough. In particular, a first horizontal aperture 72 and a second horizontal aperture 74 are disposed through the body 16 and extend from the front face 18 to the back face 20. The apertures 72 and 74 can receive bolts for use in bolting the cable bus support block 14 to the bus housing 12. The body 16 has a top face 22 and an oppositely disposed bottom face 24. A first vertical aperture 64 and a second vertical aperture 68 are disposed through the body 16 and extend from the top face 22 to the bottom face 24. A press nut 66 is located within the first vertical aperture 64, and a press nut 70 is located within the second vertical aperture 68. The bottom face 24 is flat, and the top face 22 has flat portions that are separated by the presence of various cable receiving features 30, 44 and 54.

The first cable bus support block 14 defines a first cable receiving feature 30 at the top face 22 of the body 16. The first cable receiving feature 30 can be variously shaped and configured. For example, as shown, the first cable receiving feature 30 may be in the shape of a cradle. Here, the first cable receiving feature 30 has a curved inner surface that is uniform across its length and width and that defines a semi-circular shaped aperture that is open at its top. However, it is to be understood that the first cable receiving feature 30 may be variously configured in accordance with other exemplary embodiments. For example, the first cable receiving feature 30 may define an aperture that extends through the body 16 that is square shaped and open at its top, or triangular shaped that is open at its top. The first cable receiving feature 30 has a front face edge 36 that is located at the front face 18. The first cable receiving feature 30 also has a back face edge 38 that is located at the back face 20. The front face edge 36 and the back face edge 38 may be curved in shape and can have a radius of curvature that is consistent about their entire arc length. A pair of top face edges 40 and 42 extend from the front face 18 to the back face 20. The top face edges 40 and 42 may engage the front and back face edges 36 and 38. The top face edges 40 and 42 may be linear in shape.

In accordance with certain exemplary embodiments, the front face edge 36 is rounded. In this regard, the front face edge 36 has a radius of curvature that affords a smooth transition between the front face 18 and the top face 22 that is within the first cable receiving feature 30 that is between the top face edges 40 and 42. The back face edge 38 can also be rounded with a radius of curvature that affords a smooth transition between the back face 20 and the top face 22 that is within the first cable receiving feature 30 that is between the top face edges 40 and 42. Provision of a rounded front face edge 36 and a back face edge 38 reduces wear on cable 134 that may be received within the first cable receiving feature 30 so that damage to the cable 134 is reduced or eliminated and so that the life of the cable 134 may be increased. The top face edges 40 and 42 may also be rounded in accordance with certain exemplary embodiments. Any one of or combination of edges 36, 38, 40 and 42 may be rounded in accordance with various exemplary embodiments. Further, none of the edges 36, 38, 40 and 42 are rounded in accordance with certain embodiments.

The body has a side face 26 that is rectangular in shape and an oppositely disposed side face 28 that is also rectangular in shape. The side face 26 includes side marking indicia 34 that can be used to identify the first cable bus support block 14. The side marking indicia 34 may be used to match the first cable bus support block 14 with a matching cable bus support block when constructing the cable bus system 10. The side marking indicia 34 may be a color that is painted onto the entire side face 28. During installation, the user may collect cable bus support blocks that include side marking indicia 34 that are of the same color. These support blocks may thus be match with one another so that the installer knows that they are to be connected to one another in the cable bus system 10.

First marking indicia 32 is located on the front face 18. The first marking indicia 32 is used to match the first cable bus support block 14 with additional cable bus support blocks when assembling the cable bus system 10. The first marking indicia 32 can be matched with marking indicia on the front surface of an additional cable bus support block so that the user knows that the two cable bus support blocks are matched to one another during set up. Additionally, the first marking indicia 32 can be used to orient the first cable bus support block 14 with the additional cable bus support block so that the two blocks are properly oriented with one another during installation.

The first cable bus support block 14 may have additional cable receiving features 44 and 54 that are located at the top face 22 of the body 16. The additional cable receiving features 44 and 54 may be used to receive and hold additional cables 136 and 138 in the cable bus system 10. The additional cable receiving features 44 and 54 may be configured in the same manner as previously discussed with respect to the first cable receiving feature 30. In this regard, additional cable receiving feature 44 has a front face edge 46, back face edge 48 and a pair of top face edges 50 and 52. The front face edge 46 and back face edge 48 may be rounded to prevent damage to cable 136 when contacting the front face edge 46 and the back face edge 48. Additional cable receiving feature 54 can have a front face edge 56, back face edge 58, and a pair of top face edges 60 and 62. Edges 56 and 58 may be rounded to prevent damage to cable 138 received within the receiving feature 54. Although shown as being configured in an identical manner, it is to be understood that the cable receiving features 30, 44 and 54 may be arranged differently from one another in other exemplary embodiments.

The body 16 can be made from a polymer matrix may be selected from a polyolefin, various olefin copolymers, copolymers of olefins with ethylenically unsaturated esters, and mixtures thereof. Examples of such polymers are: ultra high molecular weight polyethylene (UHMWPE), high-density polyethylene (HDPE) (d=0.940-0.970 g/cm$^3$), medium-density polyethylene (MDPE) (d=0.926-0.940 g/cm$^3$), low-density polyethylene (LDPE) (d=0.910-0.926 g/cm$^3$); copolymers of ethylene with .alpha.-olefins containing from 3 to 12 carbon atoms (for example 1-butene, 1-hexene, 1-octene and the like), in particular linear low-density polyethylene (LLDPE) and ultra-low-density polyethylene (UL-DPE) (d=0.860-0.910 g/cm$^3$); polypropylene (PP); thermoplastic copolymers of propylene with another olefin, in particular ethylene; copolymers of ethylene with at least one ester chosen from alkyl acrylates, alkyl methacrylates and vinyl carboxylates, in which the linear or branched alkyl group can contain from 1 to 8, preferably from 1 to 4, carbon atoms, while the linear or branched carboxylic group can contain from 2 to 8, preferably from 2 to 5, carbon atoms, in particular ethylene/vinyl acetate (EVA) copolymers; ethylene/ethyl acrylate (EEA) copolymers, ethylene/butyl acrylate (EBA) copolymers: ethylene/.alpha.-olefin rubbers, in particular ethylene/propylene rubbers (EPR), ethylene/propylene/diene rubbers (EPDM); natural rubber; butyl rubbers; and mixtures thereof. In accordance with one exemplary embodiment, the polymer matrix for the body 16 is high-density polyethylene (HDPE) that has a density of 0.940-0.970 g/cm$^3$.

Copolymers that may be included in the body 16 include those which can be obtained by copolymerization of ethylene with at least one .alpha.-olefin containing from 3 to 12 carbon atoms, and optionally with a diene, in the presence of a "single-site" catalyst, in particular a metallocene catalyst or a constrained geometry catalyst. These copolymers are characterized by a density of between 0.860 and 0.904 g/cm³, preferably from 0.865 to 0.902 g/cm³, and by a composition distribution index greater than 45%. The index may be defined as the percentage by weight of the copolymer molecules having an .alpha.-olefin content of up to 50% of the total average molar content of .alpha.-olefin. These copolymers preferably have the following monomer composition: 75-97 mol %, preferably 90-95 mol %, of ethylene; 3-25 mol %, preferably 5-10 mol %, of .alpha.-olefin; 0-5 mol %, preferably 0-2 mol %, of a diene. The .alpha.-olefin is preferably chosen from propylene, 1-butene, 1-hexene, 1-octene and the like. Products of this type are commercially available under the tradenames Engage® from Du Pont-Dow Elastomers having offices at PO Box 6098, Newark, Del., USA and Exact® from Exxon Chemical having offices at 5959 Las Colinas Boulevard, Irving, Tex., USA.

Polyolefin blends are also useful as polymer matrices for use in the body 16. Examples of polymer blends useful for inclusion in the body 16 include blends of HDPE with LDPE, LLDPE, PP, EVA, EEA, EMA, EBA, copolymers containing ethylene monomeric units and terpolymers containing ethylene monomeric units. The amount and type of polymer may be selected to blend with HDPE to provide the desired balance of mechanical properties.

Thermoset resins may also be utilized to produce the body 16 in accordance with certain exemplary embodiments. Examples of thermosets useful for inclusion in body 16 include: phenolics, epoxies, polyimides, melamine and polyurethanes. Phenolic resins are used in accordance with one exemplary embodiment. Examples of phenolic resins which can be employed include phenolformaldehyde, phenol-acetaldehyde, phenol-furfural, m-cresolformaldehyde and resorcinol-formaldehyde resins. Themosets can be combined with reinforcing fillers to modify the mechanical properties of the resulting material. Typical fibrous reinforcements that can be employed in the composite of the body 16 are, for example, carbon, graphite, glass, silica, quartz, asbestos and boron fibers.

Flame-retardant fillers may also be included in the body 16 and may include halogenated and non-halogenated materials. Examples of non-halogenated flame retardant materials that may be used in the body 16 include hydroxides, hydrated oxides, salts or hydrated salts of metals, in particular of calcium, aluminium or magnesium, such as: magnesium hydroxide, aluminum trihydroxide, hydrated magnesium carbonate, magnesium carbonate, hydrated calcium and magnesium carbonate, calcium and magnesium carbonate, or mixtures thereof. In accordance with one exemplary embodiment, magnesium hydroxide is present in the body 16 and is characterized by a decomposition temperature of about 340 degrees C. thus making the body 16 amenable to high temperature extrusion conditions. The flame-retardant filler is generally used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer matrix, the flame-retardant filler can likewise be surface-treated with suitable coupling agents, for example organic silanes or titanates such as vinyltriethoxysilane, vinyltriacetylsilane, tetraisopropyl titanate, tetra-n-butyl titanate and the like.

Exemplary embodiments of halogenated flame-retardants include polybrominated diphenyl ether compounds, including decabromodiphenylether (i.e., decabrom). In accordance with certain exemplary embodiments, a polybrominated flame retardant is combined with a metal synergist. Examples of useful metal synergists that may be present in body 16 include antimony compounds, including antimony trioxide.

Other examples of flame retardants that may be included in body 16 include phosphates, red phosphorous, borates and other phosphorous and boron compounds.

The amount of flame-retardant filler to be added may be selected so as to obtain a body 16 that is capable of passing the ordinary fire-resistance tests, for example E-84 or UL-94. In general, the amount of flame-retardant filler may be between 10% and 90% by weight, preferably between 30% and 80% by weight, most preferably between 40% and 60% by weight relative to the total weight of the composition of body 16.

A coupling agent capable of improving the dispersion of the flame retardant filler in the polymer matrix may be added to the formulation to improve the flame retardant performance and the mechanical properties of the resulting body 16. The coupling agent may be, for example: saturated silane compounds or silane compounds containing at least one ethylenic unsaturation; epoxides containing an ethylenic unsaturation; monocarboxylic acids or, dicarboxylic acids having at least one ethylenic unsaturation, or derivatives thereof, in particular anhydrides or esters.

Examples of silane compounds that are suitable are: gamma.-methacryloxypropyltrimethoxysilane, allyltrimethoxysilane, allyltriethoxysilane, allylmethyldimethoxysilane, allylmethyldiethoxysilane, methyltriethoxysilane, methyltris(2-methoxyethoxy) silane, dimethyldiethoxysilane, vinyltris(2-methoxyethoxy)silane, vinyltrimethoxysilane, vinylmethyldimethoxysilane, vinyltriethoxysilane, octyltriethoxysilane, isobutyltriethoxysilane, isobutyltrimethoxysilane and the like, or mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether and the like, or mixtures thereof. Monocarboxylic or dicarboxylic acids, having at least one ethylenic unsaturation, or derivatives thereof, that can be used as coupling agents are, for example: maleic acid, maleic anhydride, fumaric acid, citraconic acid, itaconic acid, acrylic acid, methacrylic acid and the like, and anhydrides or esters derived from these, or mixtures thereof. Maleic anhydride is used as a coupling agent in the body 16 in accordance with one exemplary embodiment.

The coupling agents can be used as they are or pregrafted onto a polyolefin, for example polyethylene or copolymers of ethylene with an alpha.-olefin, by means of a radical reaction. The amount of coupling agent grafted may be between 0.05 and 5 parts by weight, preferably between 0.1 and 2 parts by weight, relative to 100 parts by weight of polyolefin. Polyolefins grafted with maleic anhydride are available as commercial products known, for example, under the brand names Fusabond® from Du Pont; Orevac® from Elf Atochem having offices at 18000 Crosby Eastgate Road, Crosby, Tex., USA; Exxelor® from Exxon Chemical, and Yparex® from DSM having offices at 31 Columbia Nitrogen Road, Augusta, Ga., USA.

The amount of coupling agent to be added to the mixture may vary mainly depending on the type of coupling agent used and on the amount of flame-retardant filler added. In general, the coupling agent may be between 0.01% and 5%, preferably between 0.05 and 2%, by weight relative to the total weight of the composition of the body 16.

Other conventional additives such as antioxidants, processing coadjuvants, lubricants, pigments, other fillers and the like can be added to the compositions to impart additional performance to the body 16. Conventional antioxidants which are suitable for this purpose are, for example: polymerized trimethyldihydroquinoline, 4,4'-thiobis(3-methyl-6-tert-butyl)phenol; pentaerythryl tetra-[3-(3,5-di-tert-butyl-4-hydroxyphenyl)propionate], 2,2'-thiodiethylene bis[3-(3,5-di-tert-butyl-4-hydroxyphenyl)propionate] and the like, or mixtures thereof.

Other fillers which may be used in the body 16 include, for example, glass particles, glass fibres, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof. The flame-retardant compositions may be used in non-crosslinked form in order to obtain a coating with thermoplastic properties which is thus recyclable.

The body 16 may be formed by melt processing the polymer matrix, the flame-retardant filler and the other additives which may be present. In accordance with various exemplary embodiments, the materials making up the body 16 can be prepared by using an internal mixer of the type containing tangential rotors (commonly referred to as a Banbury® mixer) or interlocking rotors, or in continuous mixers such as a Buss® Ko-Kneader or of the co-rotating or counter-rotating twin-screw type. A Banbury® mixer may be obtained from the Farrel Corporation having offices located at 25 Main Street, Ansonia, Conn., USA. A Buss® mixer may be obtained from Buss Compounding Systems having offices at Hohenrainstr 10 CH-4133 Pratteln, Switzerland. Appropriate processing conditions (i.e., temperature, screw speed, output, screw configuration) can be selected to appropriately process the materials and may depend on the polymer matrix, flame retardant filler(s) and additives utilized in the specific formulation.

The body 16 may be from 40%-60% of polyethylene and from 40%-60% of flame retardant filler in accordance with certain exemplary embodiments. A coupling agent may also be added so that the body 16 is from 39%-59% of polyethylene, 39%-59% of flame retardant filler, and up to 2% of coupling agent in accordance with other exemplary embodiments. In accordance with other versions, the body 16 may be from 30%-70% of polymer, from 30%-70% of flame retardant filler, and from 0.05%-2% of a coupling agent. In accordance with yet other exemplary embodiments, the body 16 may be from 45%-55% of polymer, and from 45%-55% of flame retardant filler. In still further exemplary embodiments, the body 16 may be from 45%-55% of polymer, from 45%-55% of flame retardant filler, and from 0.05%-2% of coupling agent. All of the above mentioned percentages may be either by weight or by volume in accordance with various exemplary embodiments. Also, it is to be understood that the percentages of composition may be different in accordance with other exemplary embodiments.

Although described as being used to form the body 16, it is to be understood that the abovementioned materials and composition percentages, such as the high-density polyethylene, flame-retardant fillers, and coupling agents can be used to form bodies 142 and 301 of the various cable blocks in accordance with various exemplary embodiments. The various bodies 16, 142 and 301 can all include the same materials, or may include different materials in accordance with various exemplary embodiments such that their composition is not identical to one another.

Figure 7:
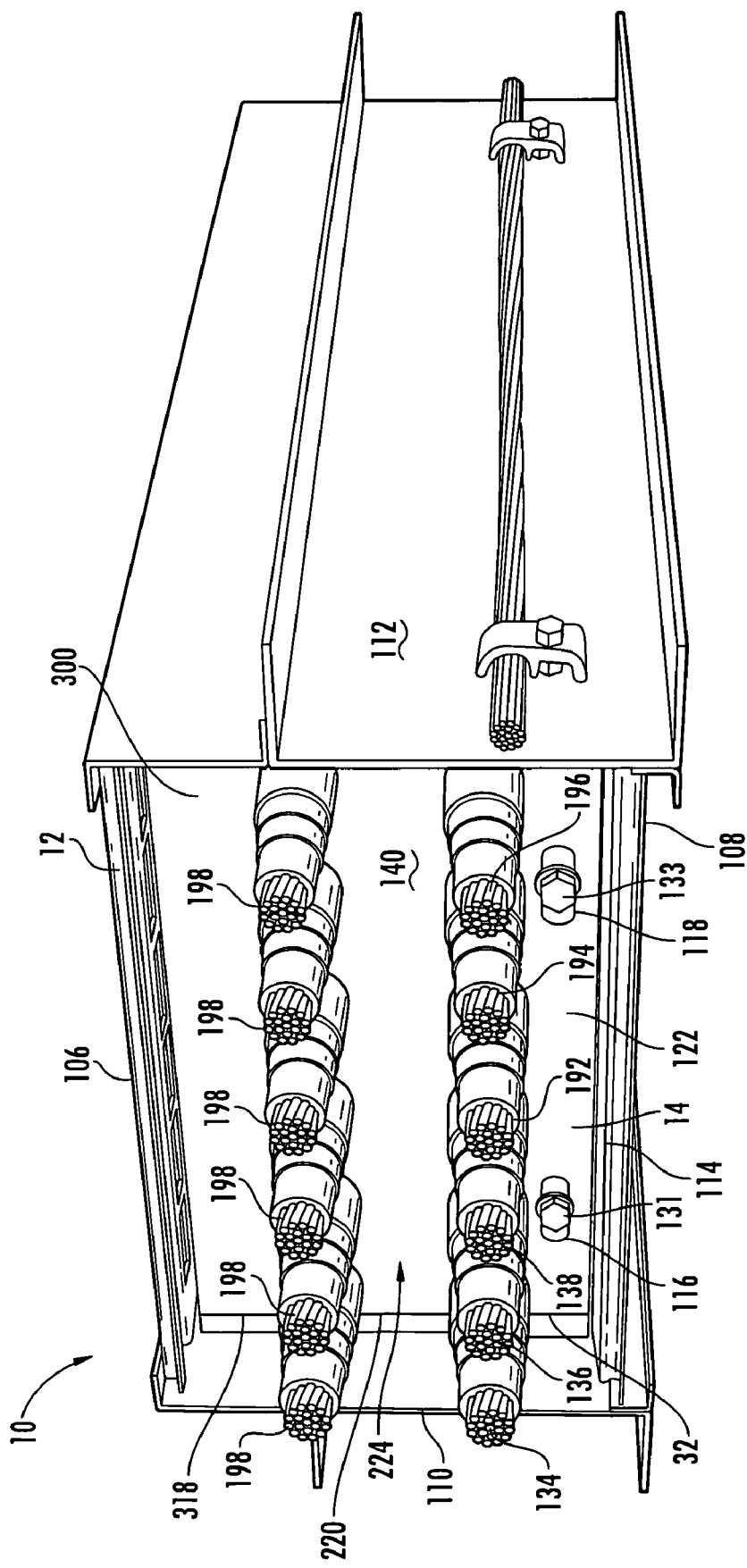
FIG. 7 is an assembled perspective view of a cable bus system in accordance with one exemplary embodiment.
Figure 8:
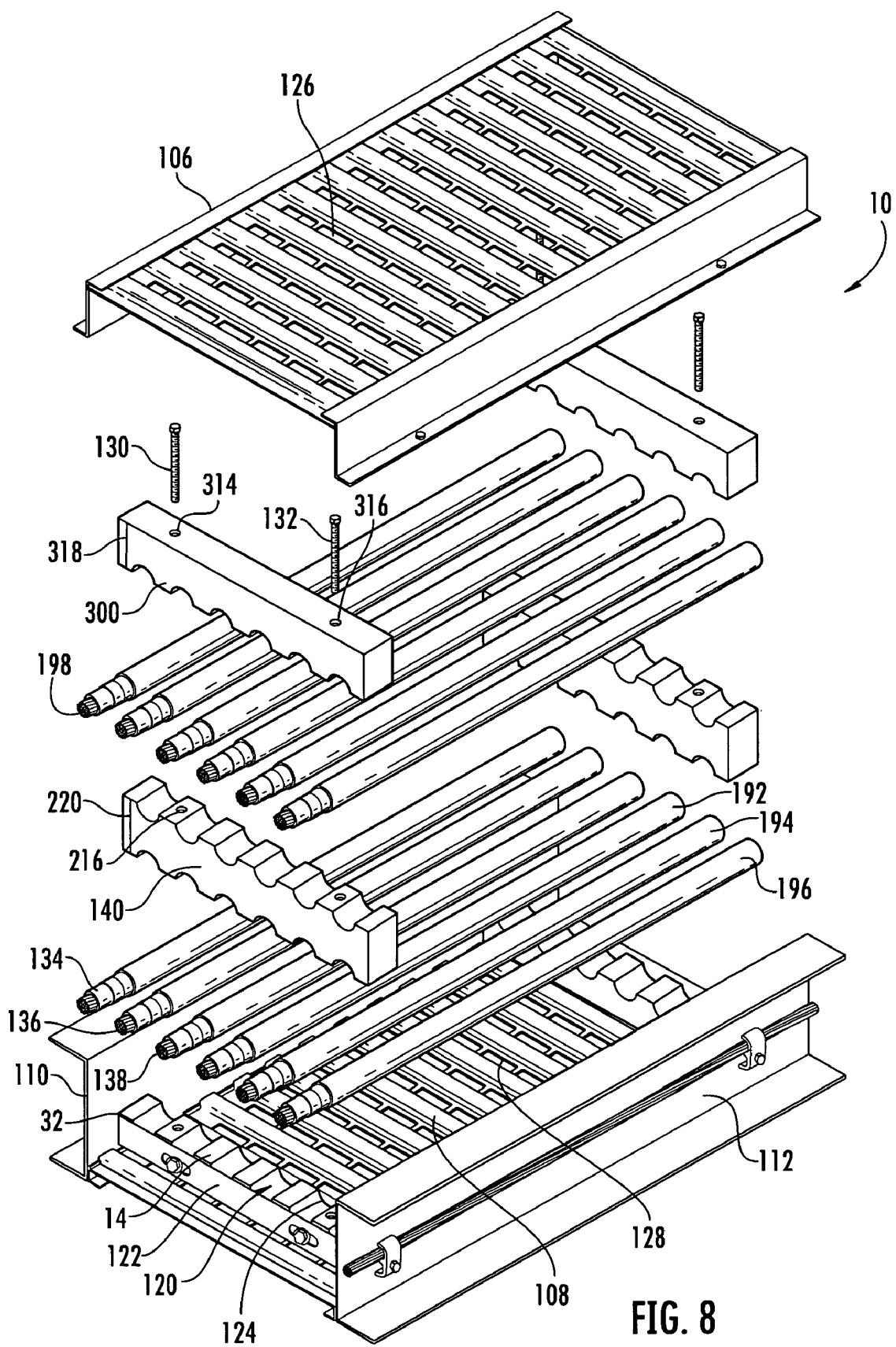
FIG. 8 is a partially exploded assembly view of the cable bus system of FIG. 7.

A cable bus system 10 is shown in FIGS. 7-10. The first cable bus support block 14 differs from the cable bus support block 14 illustrated in FIGS. 1-6. In this regard, additional cable receiving features 76, 86 and 96 are located at the top face 22. The additional cable receiving features 76, 86 and 96 can be configured in a manner identical to that previously discussed with respect to the first cable receiving feature 30. In this regard, the front and back edges of the additional cable receiving features 76, 86 and 96 can be rounded as previously discussed. The first cable bus support block 14 is attached to a mounting plate 114 of the bus housing 12. The bottom face 24 lays against the mounting plate 114 and a bolt 130 is disposed through the first vertical aperture 64. Bolt 132 is disposed through the second vertical aperture 68. Bolts 130 and 132 are attached to press nuts 66 and 70 that are within the first and second vertical apertures 64 and 68.

The bus housing 12 has a pair of side walls 110 and 112 that extend upwards from a bottom wall 108. The side walls 110 and 112 can be attached to the bottom wall 108 in a variety of manners in accordance with different exemplary embodiments. The side walls 110 and 112 can be attached to the bottom wall 108 through the use of mechanical fasteners or may be welded to the bottom wall 108 in other embodiments. The side walls 110 and 112 can various cross-sectional geometries in accordance with different embodiments of the cable bus system 10.

The cable bus system 10 includes a second cable bus support block 140 that has a body 142 made of the same materials as previously discussed above regarding the first cable bus support block 14. The second cable bus support block 140 has a front face 144 and an oppositely disposed back face 146. A bottom face 150 of the body 142 engages the top face 22 of the first cable bus support block 14. The body 142 has a side face 152 and an oppositely disposed side face 154 on the other end. Side face 152 may include side marking indicia 222 for use in identifying the second cable bus support block 140. The side marking indicia 222 may be a color, and the user may match the color of the side marking indicia 222 with the color of the side marking indicia 34 so that the first cable bus support block 14 can be matched with the second cable bus support block 140. The user will thus know that cable bus support blocks 14 and 140 are to be used with onto one another in the cable bus system 10.

The body 142 includes a second cable receiving feature 156 at the bottom face 150. The second cable receiving feature 156 may be arranged as described above with respect to the first cable receiving feature 30. In this regard, the second cable receiving feature 156 may be in the shape of a cradle and may extend from the front face 144 to the back face 146. The second cable receiving feature 156 may have a front face edge 158 at the front face 144 that is rounded in order to prevent damage to first cable 134 received within the second cable receiving feature 156. A back face edge 160 is present on the back face 146 and can likewise be rounded in order to prevent damage to first cable 134. A pair of bottom face edges 162 and 164 can extend from the front face 144 to the back face 146 such that the second cable receiving feature 156 is defined between the pair of bottom face edges 162 and 164. The bottom face edges 162 and 164 may be rounded in accordance with certain exemplary embodiments.

The first cable bus support block 14 and the second cable bus support block 140 can be arranged with respect to one another so that the first cable receiving feature 30 is located adjacent the second cable receiving feature 156. In this manner, a combined aperture is formed through which the first cable 134 can extend though both of the blocks 14 and 140. The cable receiving features 30 and 156 are positioned next to one another so that the top face edge 40 of the first cable receiving feature 30 is located adjacent and possibly contacts the bottom face edge 162 of the second cable receiving feature 156. Likewise, the top face edge 42 is located adjacent and may contact the bottom face edge 164. The first cable receiving feature 30 may be configured in the same manner as the second cable receiving feature 156, or the features 30 and 156 can be configured differently from one another in accordance with other exemplary embodiments.

The second cable bus support block 140 includes an additional cable receiving feature 166 at the bottom face 150. Additional cable receiving feature 166 can be arranged in a manner identical to that previously described with respect to the first cable receiving feature 30. In this regard, the additional cable receiving feature 166 may extend from the front face 144 to the back face 146 and be in the shape of a cradle on the bottom face 150. Front and back face edges 168 and 170 are formed and may be rounded in accordance with certain exemplary embodiments. A linear bottom face edge 172 can be located adjacent or contact the top face edge 50 of the additional cable receiving feature 44. Likewise, a linear bottom face edge 174 may be located adjacent or contact the top face edge 52 of the additional cable receiving feature 44. The adjacent cable receiving features 44 and 166 define a combined aperture for the receipt of a second cable 136.

An additional cable receiving feature 176 is defined on the bottom face 150. The additional cable receiving feature 176 may be configured in a manner identical to that previously discussed with respect to the first cable receiving feature 30. The additional cable receiving feature 176 may include rounded front and back face edges 178 and 180. A bottom face edge 182 may be located adjacent or may contact the top face edge 60 of additional cable receiving feature 54. Bottom face edge 184 may be located adjacent or contact top face edge 62 of additional cable receiving feature 54. A combined aperture is formed by the adjacent cable receiving features 176 and 54 for receipt of a third cable 138.

Additional cable receiving features 186, 188 and 190 are present on the bottom face 150 of the second cable bus support block 140 and are aligned with cable receiving features 76, 86 and 96 of the first cable bus support block 14. A fourth cable 192, fifth cable 194 and sixth cable 196 can be positioned within the aligned cable receiving features and supported therein. The additional cable receiving features 186, 188 and 190 may be configured in a manner as previously discussed with respect to the first cable receiving feature 30.

Although shown as supporting twelve cables 134, 136, 138, 192, 194 and 196 and cables 198, it is to be understood that any number of cables may be supported by the cable bus system 10 in accordance with other exemplary embodiments. Further, the cables 134, 136, 138, 192, 194, 196 and 198 may be arranged in various manners and may be used to convey various types of power and/or information. The cables 134, 136, 138, 192, 194, 196 and 198 may be jacketed and may in some circumstances include a sleeve or other member that is disposed within the combined apertures formed by the first, second and third cable bus support blocks 14, 140 and 300. The sleeve or other member may function to add extra diameter to the cables 134, 136, 138, 192, 194, 196 and 198 within the combined apertures in order to provide for secure holding therein.

The second cable bus support block 140 may include additional cable receiving features 200, 202, 204, 206, 208 and 210 at a top face 148 of the body 142. The additional cable receiving features 200, 202, 204, 206, 208 and 210 may be configured in a manner identical to those previously discussed with respect to the other cable receiving features. In this regard, the additional cable receiving features 200, 202, 204, 206, 208 and 210 may have rounded front and back edges, and may be in the shape of a cradle. A third cable bus support block 300 is stacked upon the second cable bus support block 140 and has cable receiving features 302, 304, 306, 308, 310 and 312 that are located adjacent the additional cable receiving features 200, 202, 204, 206, 208 and 210 so that combined apertures are formed. The cable receiving features 302, 304, 306, 308, 310 and 312 may be configured in a manner identical to that previously discussed with respect to the first cable receiving feature 30 or may be arranged differently in accordance with other embodiments. Additional cable 198 may then be located in the combined apertures for support in the cable bus system 10. The third cable bus support block 300 has a body 301 that can be composed of material previously discussed with respect to the other cable bus support blocks 14 and 140. Any number of additional cable bus support blocks can be incorporated into the cable bus system 10 in accordance with other exemplary embodiments. Further, although shown as having six cable receiving features along their lengths, the cable bus support blocks may have any number of cable receiving features along their lengths so that additional cables can be supported. Although shown as being configured for use in supporting two rows of cable, any number of rows of cable can be supported in other embodiments. The cable receiving features may be arranged differently in the upper row than in the lower row.

The second cable bus support block 140 includes a pair of vertical apertures 216 and 218 that extend from the top face 148 to the bottom face 150. The first vertical aperture 216 can be aligned with first vertical aperture 64 and bolt 130 may be disposed through apertures 216 and 64. Likewise the second vertical aperture 218 can be aligned with the second vertical aperture 68 and bolt 132 may be disposed through the aligned apertures 218 and 68. The third cable bus support block 300 has apertures 314 and 316. Aperture 314 is in alignment with apertures 216 and 64. Aperture 316 is placed into alignment with apertures 218 and 68. Bolts 130 and 132 may be used to effect attachment of the third cable bus support block 300, second cable bus support block 140, and first cable bus support block 14. The bolts 130 and 132 in some exemplary embodiments may be used to attach the cable bus support blocks 14, 140 and 300 to the bus housing 12 by extension of the bolts 130 and 132 through apertures present in the mounting plate 114. Although shown as being attached through the use of bolts 130 and 132, it is to be understood that the cable bus support blocks 14, 140 and 300 can be attached through various means in accordance with other exemplary embodiments. Also, any number of bolts may be employed. Further, the cable bus support blocks 14, 140 and 300 need not be connected to one another but may instead be connected to flanges of the bus housing 12 in other embodiments.

The second cable bus support block 140 includes second marking indicia 220 on the front face 144 of body 142. The second marking indicia 220 functions to identify the second cable bus support block 140 and acts to match the second cable bus support block 140 with the first cable bus support block 14. The first marking indicia 32 and second marking indicia 220 can be symbols, letters, numbers, colors, score lines, or combinations thereof. In accordance with one exemplary embodiment the first and second marking indicia 32 and 220 are score lines. During installation, a user may identify the cable bus support blocks 14 and 140 as being a match to one another upon having the same marking indicia 32 and 220. Additionally or alternatively, side marking indicia 34 and 222 may be used to identify the cable bus support blocks 14 and 140 as being a match with one another. In this regard, the side marking indicia 34 and 222 may be identical to one another so that a user knows the cable bus support blocks 14 and 140 are matched to one another.

Once the user knows the cable bus support blocks 14 and 140 are a match to one another, the user can place the first cable bus support block 14 onto the mounting plate 114 of the bus housing 12. A pair of plates 122 and 124 are present in the cable bus system 10 and are arranged so as to form a channel 120 that extends across the width of the passageway 224. The first cable bus support block 14 can be located within the channel 120 so that its position can be generally fixed. The first marking indicia 32 may still be visible on the front face 18 above the plate 122. The user can thus see the first marking indicia 32 even when the first cable bus support block 14 is located in the channel 120. The user is able to correctly orient and locate the second cable bus support block 140 by way of aligning or otherwise correctly orienting the second marking indicia 220 with the first marking indicia 32. The user can then correctly place the second cable bus support block 140 on top of the first cable bus support block 14. If a score line is used for both marking indicia 32 and marking indicia 220, the score lines can be aligned with one another as illustrated in FIG. 9. It may be the case that the first cable receiving feature 30 is not to be located adjacent the second cable receiving feature 156. If the user incorrectly positions the first and second cable bus support blocks 14 and 140 in this manner, the marking indicia 32 and 220 will indicate that the blocks 14 and 140 are not properly oriented. Further, although the first and second cable receiving features 30 and 156 may be aligned and still function to make a suitable aperture if they are incorrectly positioned, other apertures formed by the first and second cable bus support blocks 14 and 140 may be improperly formed if the two blocks 14 and 140 are not properly oriented with respect to one another. The marking indicia 32 and 220 thus functions to match and properly orient the first and second cable bus support blocks 14 and 140 in the cable bus system 10.

Placement of the first and second marking indicia 32 and 220 on the front faces 18 and 144 allows the indicia 32 and 220 to be seen when the blocks 14 and 140 are inserted into channel 120. As such, the marking indicia 32 and 220 can be located on the front faces 18 and 144 so that they are visible when the blocks 14 and 140 are installed by the user into channel 120. The first and second marking indicia 32 and 222 thus face towards the passageway 224 of the bus housing 12 and not towards the side walls 110 and 112 of the bus housing in certain exemplary embodiments. The first and second marking indicia 32 and 220 can be provided so that the installer knows the correct upwards or downwards orientation of the support blocks 14 and 140. Additionally or alternatively, the marking indicia 32 and 220 may provide information towards the orientation of the blocks 14 and 140 with respect to one another and not with respect to the bus housing 12. In certain embodiments, the first and second marking indicia 32 and 220 can provide information to the user so that the user knows which direction within the passageway 224 the blocks 14 and 140 are to face.

The user may thus correctly place and orient the second cable bus support block 140 on top of the first cable bus support block 14. Apertures 116 and 118 may be present in the plate 122. Aligned apertures may be present in the other plate 124 forming the channel 120. Bolts 131 and 133 may be disposed through the apertures 116 and 118 in order to effect attachment of the first cable bus support block 14 to the bus housing 12. Bolts 130 and 132 may also be present and can be disposed through vertical apertures 64, 68, 216, 218, 314 and 316 of the first, second and third cable bus support blocks 14, 140 and 300 as previously discussed in order to effect attachment of these components. In an alternative embodiment, the bolts 130 and 132 may extend through the mounting plate 114 as previously discussed to function to further retain the first, second and third cable bus support blocks 14, 140 and 300 to the cable bus system 10. However the bolts 130 and 132 may simply engage press nuts 66 and 70 that could be located in the first cable bus support block 14 in certain embodiments without being attached to the mounting plate 114.

The third cable bus support block 300 can also have marking indicia 318 located on its front face. The user may align or otherwise match the marking indicia 220 and 318 so that the second cable bus support block 140 and the third cable bus support block 300 are properly oriented. The marking indicia 318 can be a score line as previously discussed with respect to other embodiments. The marking indicia 32, 220 and 318 may each extend completely from the bottom face to the top face on the front face of the respective cable bus support blocks 14, 140 and 300. The marking indicia 14, 140 and 300 may be visible to the user when the blocks 14, 140 and 300 are installed into the channel 120. Additionally, the third cable bus support block 300 can have side marking 320 in order to match this block 300 with the other two blocks 14 and 140 of the set. However, it is to be understood that the marking indicia 34, 220 and 318 may be used to match the set of blocks 14, 140 and 300.

During installation, multiple cable bus support blocks may be present for the user. Provision of the marking indicia 32, 220 and 318 on the front face enables the installer to know which cable bus support blocks go with one another and provides insight as to their proper orientation with respect to one another. Although described as including marking indicia 34, 222 and 318, this indicia need not be present in certain exemplary embodiments. Further, although described as having side marking indicia 32, 220 and 320, it is to be understood that these markings 32, 220 and 320 need not be present in accordance with other exemplary embodiments.

A top wall 106 may be attached to the side walls 110 and 112 in order to define a passageway 224 of the bus housing 12. The top wall 106 can be attached to the side walls 110 and 112 through the use of mechanical fasteners, welding, or adhesion in accordance with certain exemplary embodiments. The top wall 106 includes vents 126, and bottom wall 108 includes vents 128. Vents 126 and 128 function to cool the passageway 224 during use of the cable bus system 10 such that heat generated by transferring power or information through cables 134, 136, 138, 192, 194, 196 and 198 can be transferred from the passageway 224 through vents 126 and 128 to minimize temperature elevations of the cable bus system 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:
1. A cable bus support block, comprising:
A body formed at least partially by a polymer and at least partially by a flame-retardant filler, wherein the body has a front face, a back face, a top face and an oppositely disposed bottom face, wherein the body defines a cable receiving feature for use in receiving a cable used in a cable bus support, wherein at least a portion of the front face from the top face to the bottom face is flat, wherein the body has a first top face edge that extends from the front face to the back face and wherein the body has a second top face edge that extends from the front face to the back face, wherein the cable receiving feature is between the first and second top face edges;

wherein the cable is received in the cable receiving feature and extends from the cable receiving feature past the front face and is uncovered immediately upon extending past the front face; and a second cable bus support block located adjacent the cable bus support block, wherein the second cable bus support block has a body that has a front face, a back face, and a bottom face, wherein the body of the second cable bus support block defines a second cable receiving feature that extends from the front face to the back face of the body of the second cable bus support block, wherein the body of the second cable bus support block has a first bottom face edge and a second bottom face edge that both extend from the front face to the back face of the body of the second cable bus support block such that the second cable receiving feature is located between the first bottom face edge and the second bottom face edge;

wherein the first top face edge contacts the first bottom face edge, and wherein the second top face edge contacts the second bottom face edge.

2. The cable bus support block as set forth in claim 1, wherein the polymer forming the body is polyethylene that has a density from 0.94 grams per cubic centimeter to 0.97 grams per cubic centimeter, wherein from 40% to 60% of the body is made of the polyethylene, and wherein from 40% to 60% of the body is made of the flame-retardant filler.

3. The cable bus support block as set forth in claim 1, wherein the cable receiving feature is a cradle that is defined on the top face of the body, wherein the cradle extends from the front face to the back face and has a front face edge, a back face edge, and a pair of top face edges that are the first top face edge and the second top face edge, wherein the cable has a jacket that is the portion of the cable that is uncovered immediately upon extending past the front face.

4. The cable bus support block as set forth in claim 3, wherein the front face edge and the back face edge of the cradle are rounded.

5. The cable bus support block as set forth in claim 3, wherein:

a second cradle is defined on the top face of the body and extends from the front face to the back face, wherein the second cradle has a second cradle front face edge, a second cradle back face edge, and a pair of second cradle top face edges; and wherein a third cradle is defined on the top face of the body and extends from the front face to the back face, wherein the third cradle has a third cradle front face edge, a third cradle back face edge, and a pair of third cradle top face edges.

6. The cable bus support block as set forth in claim 1, further comprising marking indicia located on the front face of the body for use in matching and orienting the body with the body of the second cable bus support block that has matching marking indicia.

7. The cable bus support block as set forth in claim 6, wherein the body has a side face that extends from the front face to the back face, and further comprising side marking indicia located on the side face of the body for use in matching the body with the body of the second cable bus support block that has matching side marking indicia.

8. The cable bus support block as set forth in claim 6, wherein the marking indicia is a score line.

9. A cable bus system, comprising:
a bus housing;
a first cable bus support block carried by the bus housing, wherein the first cable bus support block has a body that has a front face, a back face, and a top face, wherein the body of the first cable bus support block defines a first cable receiving feature that extends from the front face to the back face of the body of the first cable bus support block, wherein first marking indicia is present on the front face of the first cable bus support block, wherein the body has a side face from which the front face, the back face, and the top face extend, wherein a side marking indicia is present on the side face and is a color that is painted onto the entire side face; and a second cable bus support block located adjacent the first cable bus support block, wherein the second cable bus support block has a body that has a front face, a back face, and a bottom face, wherein the body of the second cable bus support block defines a second cable receiving feature that extends from the front face to the back face of the body of the second cable bus support block, wherein second marking indicia is present on the front face of the second cable bus support block, wherein the first marking indicia and the second marking indicia are used to match the first cable bus support block to the second cable bus support block, and wherein the first marking indicia is used to orient the first cable bus support block with the second cable bus support block, wherein the body of the second cable bus support block has a side face from which the front face, the back face, and the bottom face extend, wherein a second side marking indicia is present on the side face of the body of the second cable bus support block and is a color that is painted onto the entire side face of the second cable bus support block and matches the color of the side marking indicia of the body of the first cable bus support block.

10. The cable bus system as set forth in claim 9, wherein the bus housing defines a plurality of vents, and wherein the bus housing defines a channel across the width of the bus housing, and wherein the first cable bus support block is at least partially disposed in the channel.

11. The cable bus system as set forth in claim 9, wherein the first cable bus support block is bolted to the bus housing.

12. The cable bus system as set forth in claim 9, wherein the top face of the first cable bus support block contacts the bottom face of the second cable bus support block, wherein the first cable receiving feature of the first cable bus support block is located adjacent the second cable receiving feature of the second cable bus support block, and further comprising a cable that extends through the adjacent first and second cable receiving features.

13. The cable bus system as set forth in claim 9, wherein:
the first cable receiving feature is a cradle that has a front face edge, a back face edge, and a pair of top face edges; and
wherein the second cable receiving feature is a cradle that has a front face edge, a back face edge, and a pair of bottom face edges.

14. The cable bus system as set forth in claim 13, wherein the front face edge and the back face edge of the first cable receiving feature are rounded, and wherein the front face edge and the back face edge of the second cable receiving feature are rounded.

15. The cable bus system as set forth in claim 9, wherein the body of the first cable bus support block is at least 40% of polyethylene and is at least 40% of fire retardant filler, and wherein the body of the second cable bus support block is at least 40% of polyethylene and is at least 40% of fire retardant filler.

16. The cable bus system as set forth in claim 9, wherein the first marking indicia and the second marking indicia are score lines, and wherein the score line of the first cable bus support block is aligned with the score line of the second cable bus support block, and wherein the score lines of the first and second cable bus support blocks face the interior passageway of the bus housing.

17. A cable bus system, comprising:
 a bus housing;
 a first cable bus support block carried by the bus housing, wherein the first cable bus support block has a body that has a front face, a back face, and a top face, wherein the body of the first cable bus support block defines a first cable receiving feature that is a cradle that extends from the front face to the back face of the body of the first cable bus support block, wherein the first cable receiving feature has a rounded front face edge, a back face edge, and a pair of top face edges,
 wherein the front face edge is semi-circular in shape from one of the top face edges extending to the other one of the top face edges, and wherein the front face edge is rounded convex such that the front face edge has a radius of curvature that affords a smooth transition between the front face and the portion of the top face that is within the first cable receiving feature that is between the pair of top face edges; and
 a second cable bus support block that contacts the first cable bus support block, wherein the second cable bus support block has a body that has a front face, a back face, and a bottom face, wherein the body of the second cable bus support block defines a second cable receiving feature that is a cradle that extends from the front face to the back face of the body of the second cable bus support block, wherein the second cable receiving feature has a rounded convex front face edge, a back face edge, and a pair of bottom face edges.

18. The cable bus system as set forth in claim 17, wherein the back face edges of the first cable receiving feature and the second cable receiving feature are convex rounded in shape, wherein first marking indicia is present on the front face of the first cable bus support block, and wherein second marking indicia is present on the front face of the second cable bus support block.

19. The cable bus system as set forth in claim 18, wherein the first marking indicia and the second marking indicia are score lines, and wherein the score line of the first cable bus support block is aligned with the score line of the second cable bus support block, and wherein the score lines of the first and second cable bus support blocks face the interior passageway of the bus housing.

20. The cable bus system as set forth in claim 17, wherein the body of the first cable bus support block is at least 40% of polyethylene and is at least 40% of fire retardant filler, and wherein the body of the second cable bus support block is at least 40% of polyethylene and is at least 40% of fire retardant filler.

\* \* \* \* \*